United States Patent [19]
Co et al.

[11] Patent Number: 5,325,400
[45] Date of Patent: Jun. 28, 1994

[54] METHOD AND APPARATUS FOR PREDISTORTION OF SIGNALS IN DIGITAL TRANSMISSION SYSTEMS

[75] Inventors: Ramon S. Co, Milpitas; Ron Kao, San Jose, both of Calif.

[73] Assignee: The LAN Guys, Inc., Sunnyvale, Calif.

[21] Appl. No.: 893,468

[22] Filed: Jun. 4, 1992

[51] Int. Cl.⁵ ............................................ H04L 25/49
[52] U.S. Cl. .................................... 375/60; 307/555; 375/58; 455/114
[58] Field of Search ................... 375/60, 51, 57, 58, 375/36; 455/114; 307/555, 260, 261, 268

[56] References Cited

U.S. PATENT DOCUMENTS

| | | | |
|---|---|---|---|
| 3,980,826 | 9/1976 | Widmer | 375/60 |
| 4,757,519 | 7/1988 | Collison et al. | 375/60 |
| 5,157,277 | 10/1992 | Tran et al. | 307/269 |
| 5,204,880 | 4/1993 | Wurster et al. | 375/36 |

*Primary Examiner*—Stephen Chin
*Assistant Examiner*—Hai H. Phan
*Attorney, Agent, or Firm*—Benman Collins & Sawyer

[57] ABSTRACT

A method and apparatus for predistorting digital signals so as to minimize radiation of harmonic signal energy during data transmission. The programmable waveshaping apparatus of the present invention is operative to predistort a binary encoded waveform to be transmitted over a transmission line. A pulse discriminator circuit is disposed to indicate the receipt of each pulse within an input sequence of short and long pulses included within the encoded waveform. Upon receipt of each short and long pulse an input logic network generates first and second sets of control signals, respectively. The logic network synthesizes the control signals based on information relating to sampled approximations of filtered versions of the short and long pulses. The inventive waveshaping apparatus further includes a programmable electrical source array for generating a sequence of line driving signals in accordance with each set of control signals. A transformer driver then pulses the transmission line in response to the driving signals in order to transmit information included within the encoded input sequence.

16 Claims, 7 Drawing Sheets

METHOD AND APPARATUS FOR PREDISTORTION OF SIGNALS IN DIGITAL TRANSMISSION SYSTEMS

BACKGROUND OF THE INVENTION

1. Field of the Invention

The present invention relates to the transmission of data within digital systems such as local area networks (LANs). More specifically, this invention relates to the predistortion of binary encoded data in such systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

The interest in local-area networks is steadily increasing. Local area networks facilitate economical data communication between computing systems clustered in a locality. Networks used widely in the art are known as token ring LAN's and Ethernet LAN's.

A token ring LAN is a circular network having a plurality of stations (nodes) interconnected in a ring topology. Access to the network is controlled by the possession of a signal "token". The token is a packet of signals that is passed from node to node. The node that has the token has control of the network with respect to the transmission of data to other nodes and the receipt of data from the same. When the node has completed a transmission, the token is released for acquisition by another node.

Ease of clock extraction has been an important factor bearing on the selection of a transmission code within LANs. In this regard the Manchester coding scheme is favored as allowing for relatively simple clock extraction, since this code produces a zero crossing at every midbit interval irrespective of the specific data pattern. In addition, the zero DC component carried by Manchester coded signals facilitates AC coupling by using transformers to provide protection.

In LAN systems employing a Manchester coding scheme the quality of the transmission is primarily determined by signal-to-noise ratio and the phase distortion introduced by the transmission line. Numerous techniques are known in the art for increasing signal-to-noise ratio, but detection of a signal degraded by transmission-induced phase distortion is generally more difficult. Specifically, a valid Manchester data waveform may be characterized as a sequence of short and long pulses of duration T/2 and T, respectively, where T signifies the reciprocal of the bit rate. As the spectral composition of the two pulse types are not identical, the propagation delay is different for each since conventional transmission lines exhibit a "low-pass" type transfer function. Accordingly, the spacing between transitions in the Manchester waveform will vary as a function of the data pattern. This phase distortion induced by the transmission line makes recovery of the clock frequency from the Manchester data more difficult and susceptible to error.

In order to counteract the effects of phase distortion over lengthy transmission lines it is known to provide a pre-equalizer at the transmitting end of the line, or to include a post-equalizer at the receiving end of the line. The equalizer serves to introduce a compensatory distortion opposite to that engendered by the tranmission line. However, since such distortion varies with line length the equalizer or filter must be adjusted for a particular transmission distance. This leads to system inflexibility since changes in line length require corresponding adjustment of the equalizer or filter.

An alternative technique for reducing phase distortion induced by transmission lines has been proposed by Widmer in U.S. Pat. No. 3,980,826, issued Sep. 14, 1976, and entitled "Means of Predistorting Digital Signals". Widmer discloses a method and means for transmitting a waveform of mixed frequency content over a transmission line in a manner designed to reduce distortion. The specific application addressed by Widmer relates to a bifrequency or biphase encoded binary data transmission system. Distortion is ostensibly minimized by reducing the low frequency content of the signal. This is accomplished by first distinguishing bits encoded at the lower frequency of the bifrequency encoded data, and by then making a step reduction in the amplitude of the low frequency bits. This process reduces the initial amplitude of the low frequency bits during the latter portion of each of the bit periods.

Nonetheless, the predistorted waveforms proposed by Widmer include signal harmonics having appreciable power density. The harmonics tend to radiate from commonly employed transmission media such as unshielded twisted pair cable. This parasitic radiation may engender crosstalk between system components or lead to errors in data transmission. Moreover, regulations promulgated by the Federal Communications Commission (FCC) limit the magnitude of signal harmonics which may be radiated by communications equipment and the like.

Accordingly, a need exists in the art for a technique for predistorting an encoded digital signal so as to minimize phase distortion and harmonic radiation during signal transmission.

SUMMARY OF THE INVENTION

The aforementioned need in the art for a method of predistorting digital signals so as to minimize parasitic harmonic radiation during signal transmission is addressed by the programmable waveshaping apparatus of the present invention. The inventive waveshaping apparatus is operative to predistort a binary encoded waveform to be transmitted over a transmission line. A pulse discriminator circuit is disposed to indicate the receipt of each pulse within an input sequence of short and long pulses included within the encoded waveform. Upon receipt of each short and long pulse an input logic network generates first and second sets of control signals, respectively. The logic network synthesizes the control signals based on information relating to sampled approximations of filtered versions of the short and long pulses.

The inventive waveshaping apparatus further includes a programmable electrical source array for generating a sequence of line driving signals in accordance with each set of control signals. A transformer driver then pulses the transmission line in response to the driving signals thereby launching the sampled approximations in order to transmit the information included within the encoded input sequence.

DETAILED DESCRIPTION OF THE INVENTION

Figure 1A:
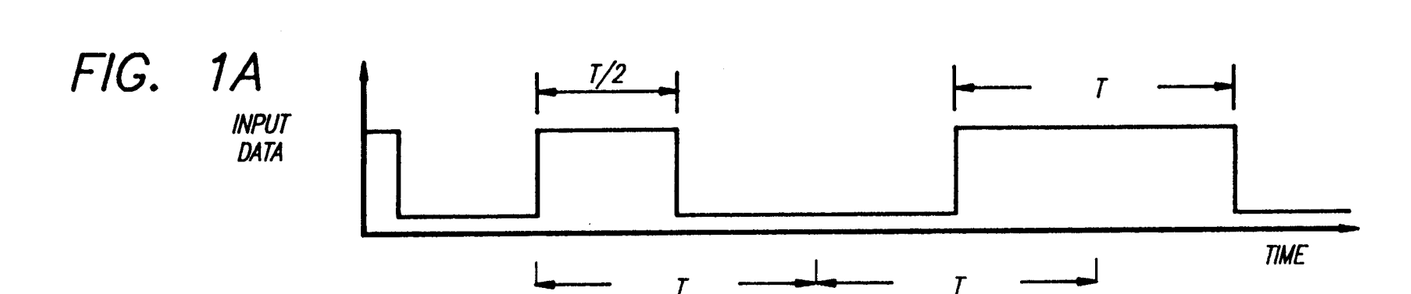
FIG. 1a depicts a binary encoded waveform having a sequence of short and long pulses.

FIG. 1a depicts a binary encoded waveform which includes a sequence of short and long pulses. The long pulses may be considered to have a pulse width of T and the short pulses a pulse width of T/2, where T corresponds to the bit period. The waveform of the system clock at twice the bit rate is illustratively represented in FIG. 1b.

The information included within the pulse sequence of FIG. 1a may be represented by a number of code assignments, including that commonly referred to as Manchester code. For example, a binary 1 is typically represented in conventional Manchester code by a rising transition in the middle of the bit period. Similarly, a binary 0 admits to a Manchester representation characterized by a falling transition in the middle of the bit period.

Figures 1B, 2:
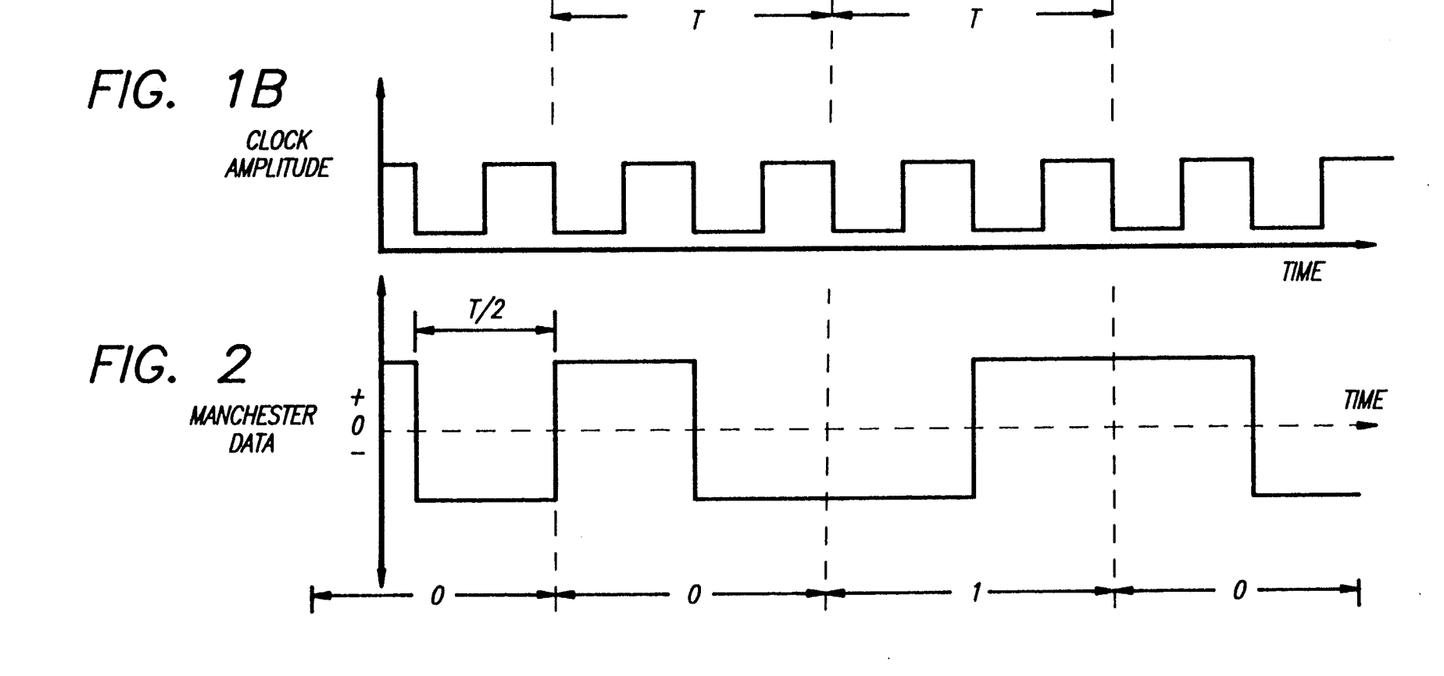
FIG. 1b is an illustrative representation of a waveform generated by a system clock.
FIG. 2 shows the encoded waveform of FIG. 1a in a Manchester data format.

FIG. 2 shows the Manchester representation of the encoded waveform of FIG. 1a. As shown in FIG. 2, the Manchester representation of each binary numeral ideally crosses zero at the center of each data bit. However, as discussed in the Background of the Invention the differing spectral content of the short and long pulses induces variation in the transmission delay between successive changes in the polarity (zero crossings) of the pulse waveforms. It is thus an object of the present invention to transmit the information inherent within the Manchester data transitions while simultaneously reducing phase distortion and harmonic signal radiation.

Figure 3:
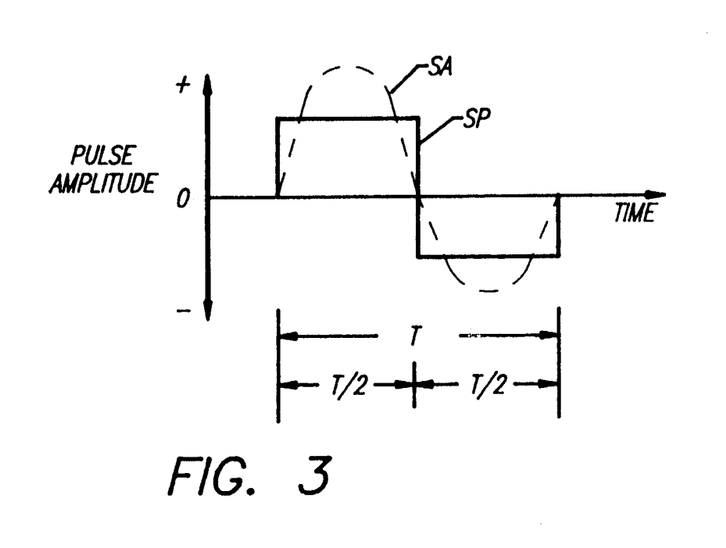
FIG. 3 shows a magnified view of a Manchester short pulse (SP) of period T and a sinusoidal approximation (SA) thereof.

FIG. 3 shows a magnified view of a positive "short" pulse (SP) of pulse width T/2 followed by a negative short pulse of width T/2. Also shown in FIG. 3 is a sinusoidal approximation (SA) of the pulse SP. The approximation SA may be derived, for example, by passing the pulse SP through an actual physical implementation of a low-pass filter or by modeling the same using a circuit analysis program (e.g. SPICE). In either approach the approximation SA is obtained by employing a filter of sufficiently low cut-off frequency such that primarily and exclusively the fundamental frequency associated with the pulse SP is transmitted thereby.

Since the pulse SP and the sinusoidal approximation SA both make a transition from a positive to a negative value at the center of the data bit, the same Manchester information is inherent within each waveform. However, the approximation SA is ideally composed substantially of a single frequency with minimal harmonic signal content. Accordingly, transmission of the approximation SA rather than the pulse SP would engender less parasitic radiation as a consequence of the absence of harmonic frequencies. Implementation of this approach in a conventional manner would require the employment of, for example, a high-order analog filter having a large number of analog circuit elements. Unfortunately, such filters are typically complex, expensive and introduce the imprecision associated with analog components into the digital transmission system.

Figure 4:
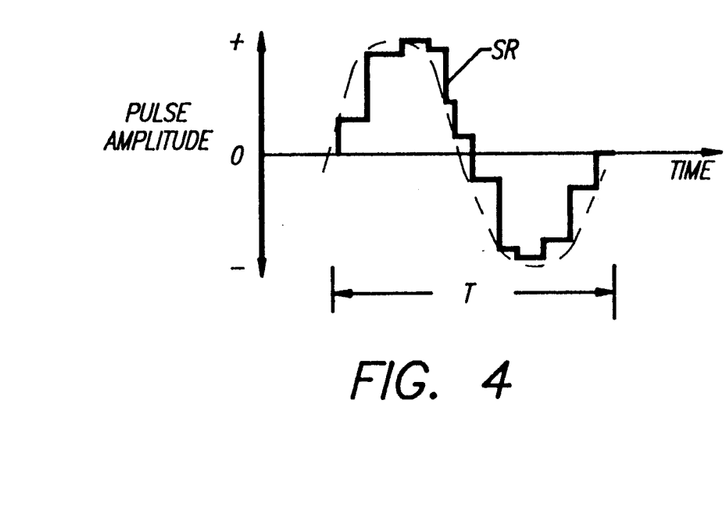
FIG. 4 illustratively represents an inventive sampled representation (SR) of the sinusoidal approximation (SA) of the Manchester short pulse (SP).

As shown in FIG. 4, in order to overcome the difficulties associated with directly synthesizing the waveform SA while still retaining the benefits of the reduced harmonic content associated therewith the present invention contemplates substituting a sampled representation (SR) of the waveform SA for the pulse SP. The sampled waveform SR includes a plurality of evenly spaced pulses having amplitudes equal to that of the continuous-time waveform SA at specific phase intervals.

Figure 5:
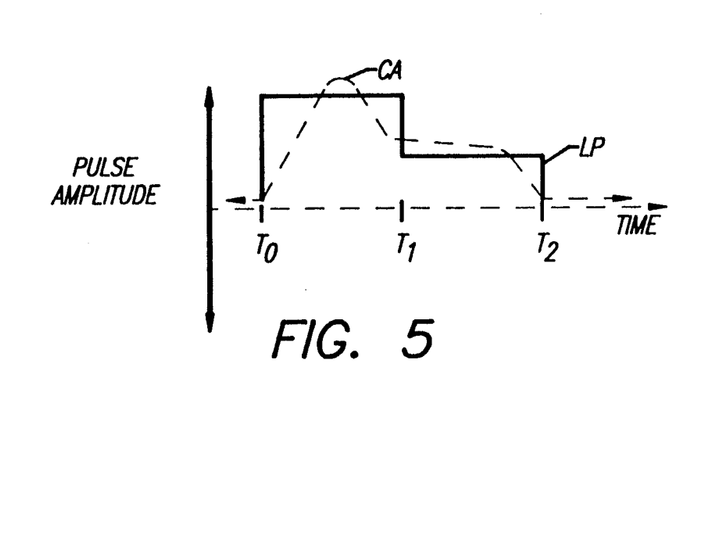
FIG. 5 shows a magnified view of a predistorted long pulse (LP) of period T included within the Manchester sequence of FIG. 2.

Similarly, FIG. 5 shows a magnified view of a predistorted "long" pulse (LP) of pulse width T included within the Manchester sequence of FIG. 2. The pulse LP has been predistorted by reducing the amplitude thereof over the interval $t_1$ to $t_2$ so as to substantially equalize the delay of the short and long pulses SP and LP through a particular transmission line. The specific mode of predistortion depicted in FIG. 5 has been discussed in the context of delay equalization by Widmer in the aforementioned U.S. Pat. No. 3,980,826, entitled "Means of Predistorting Digital Signals". However, the predistorted long pulse LP nonetheless includes substantial harmonic signal energy. Again, these harmonic signal components tend to induce parasitic radiation upon transmission of the pulse LP.

A continuous-time approximation (CA) of the predistorted long pulse (LP) is also shown in FIG. 5. As is evident in FIG. 5, the continuous waveform CA initially traverses a sinusoidal path corresponding to the low-pass filtered version of the pulse LP over the interval $t_0$ to $t_1$. The portion of the waveform CA extending from time $t_1$ to time $t_2$ will generally be derived empirically with a view to, for example, substantially eliminating phase distortion between the transmitted waveforms synthesized by the present invention. Such an empirical derivation will generally include the step of simulating the transmission line of interest as a lumped element in a circuit analysis program such as SPICE. Alternatively, an actual physical model of the transmission line may be fabricated to effectuate the empirical derivation. In addition, the continuous time waveform shown in FIG. 5 will initially be formulated to have an amplitude over the segment $t_1$ to $t_2$ that is, for example, approximately one-half of the amplitude between $t_0$ and $t_1$. This initial formulation is then transmitted through the transmission line model in order to determine the propagation delay. The propagation delay is then adjusted in subsequent iterations to be in conformity with that of the short pulse approximation SA by adjusting the amplitude of the long pulse continuous-time approximation over the interval $t_1$ to $t_2$.

Figure 6:
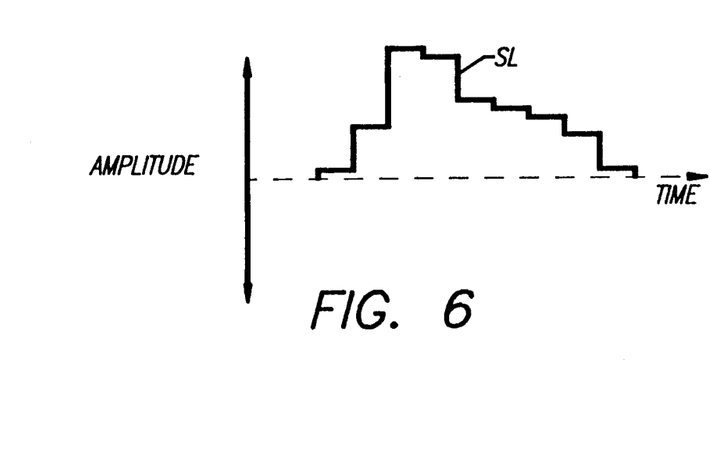
FIG. 6 shows an inventive sampled representation (SL) of the long pulse LP based on a continuous-time approximation thereof.

FIG. 6 shows an inventive sampled representation (SL) for the long pulse LP (FIG. 5) analogous to the inventive waveform SR (FIG. 4) synthesized for the short pulse SP (FIG. 3). Again, in order to overcome the difficulties associated with directly formulating the analog waveform CA while still retaining the benefits of the reduced harmonic content associated therewith the present invention contemplates substitution of the sampled representation SL for the long pulse LP. As shown in FIG. 6 the sampled waveform SL includes a plurality of equally spaced step transistions. Again, the magnitude of the waveform SL is equal to that of the continuous-time waveform CA at specific phase intervals.

The inventive approach exemplified by FIGS. 4 and 6 enables the tranmission of Manchester data having substantially reduced harmonic content relative to that inherent in conventional Manchester data waveforms. As indicated above, the data transmission scheme of the present invention does not require that an analog filter be employed to achieve this reduction in harmonic signal radiation. Rather, the inventive transmission scheme may be effected by utilizing, for example, a set of digitally-controlled current sources.

Figure 7A:
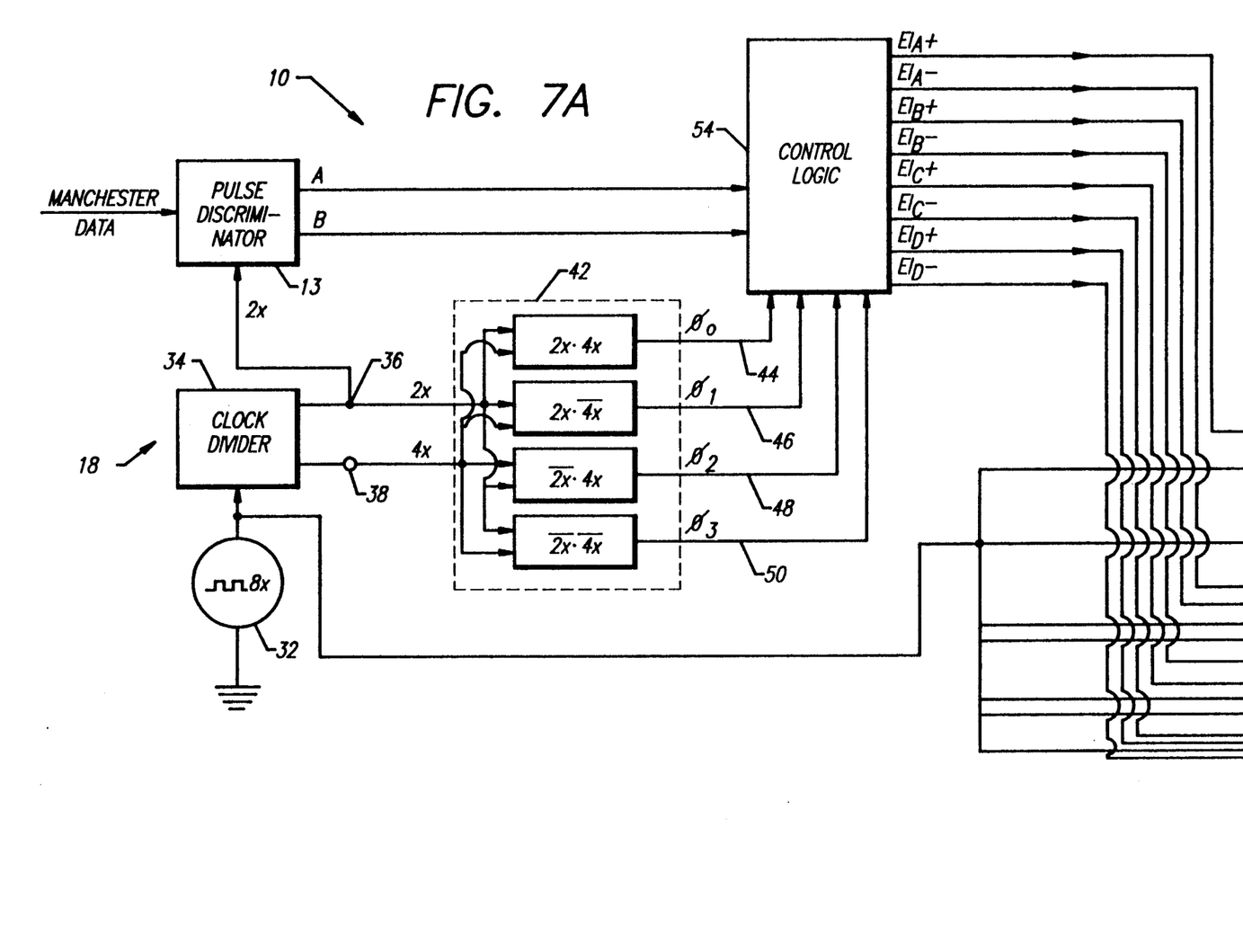
FIGS. 7a and 7b show a block diagrammatic representation of a preferred embodiment of the programmable waveshaping apparatus of the present invention.
Figure 7B:
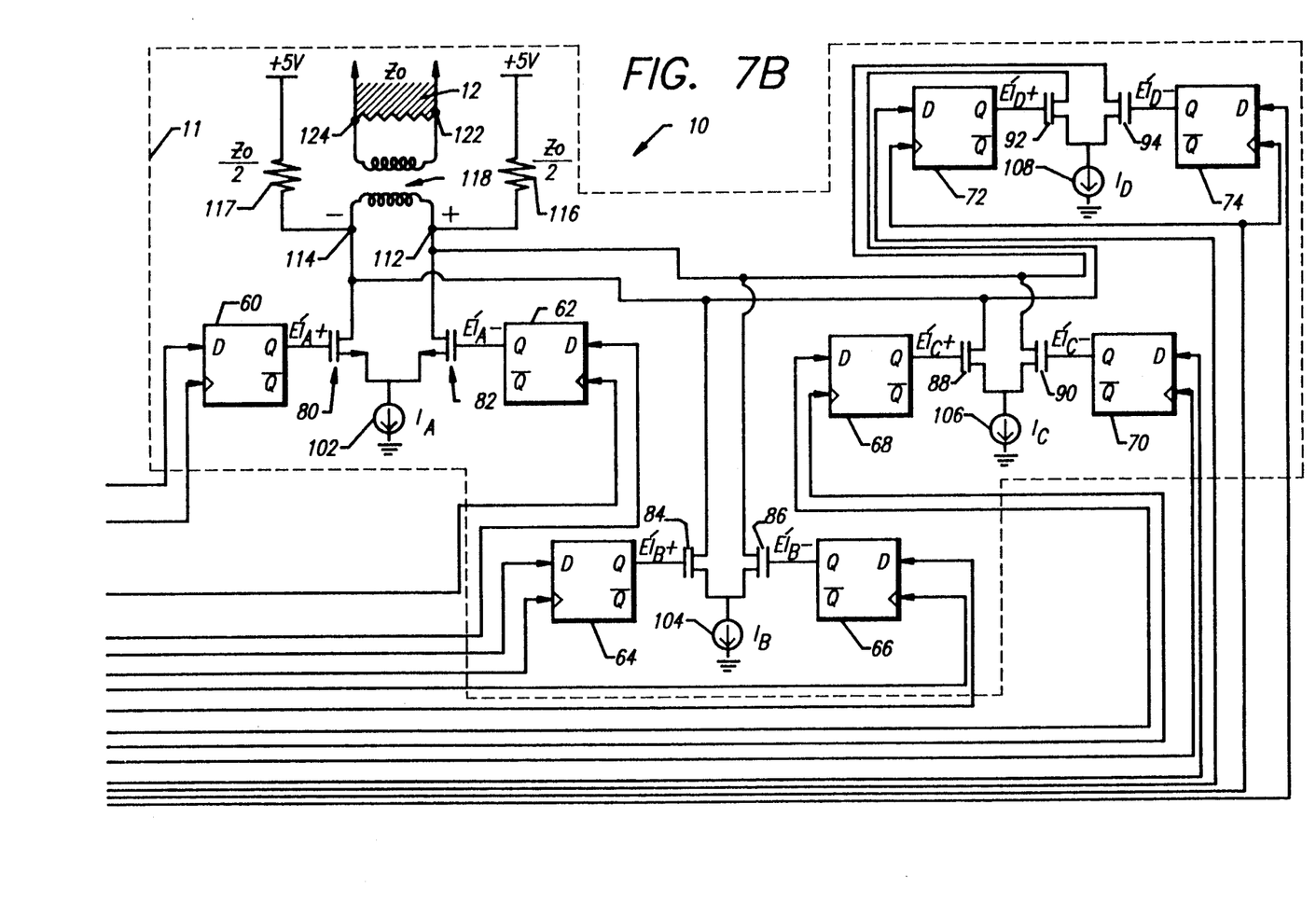

More specifically, FIGS. 7a and 7b show a block diagrammatic representation of a preferred embodiment of the programmable waveshaping apparatus 10 of the present invention. In the preferred embodiment of FIGS. 7a and 7b the inventive waveshaping apparatus 10 is operative to transmit the sampled approximations SR and SL of filtered Manchester data described with reference to FIGS. 4 and 6, respectively. As shown in FIGS. 7a and 7b, the apparatus 10 includes a programmable array of current sources 11 for launching the approximations SR and SL on a digital signal line 12. As shown in FIGS. 7a and 7b, the Manchester data is initially received and processed by a pulse discriminator 13. The discriminator 13 is designed to distinguish the long from the short pulses within the incident Manchester waveform.

Figure 8:
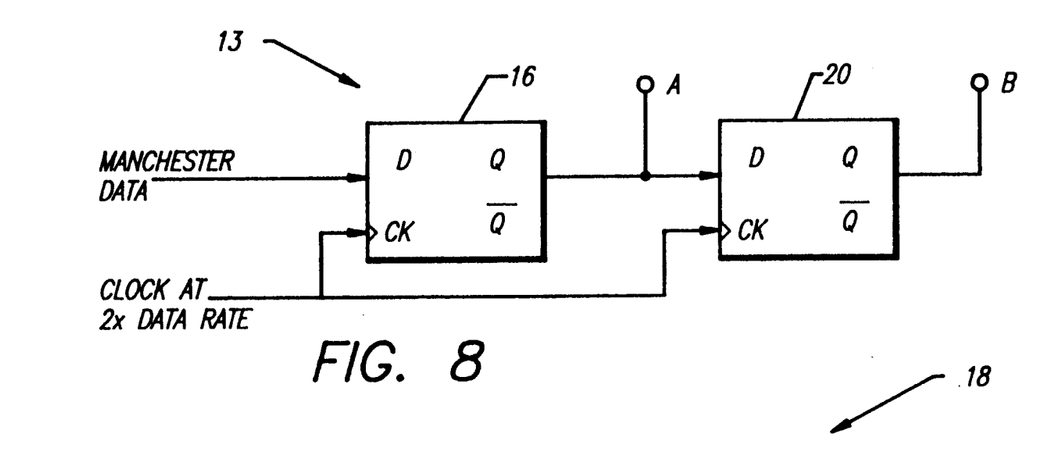
FIG. 8 depicts a logical schematic of a pulse discriminator included within a preferred embodiment of the inventive waveshaping apparatus.

FIG. 8 depicts a logical schematic of the discriminator 13. In particular, the incident Manchester data addresses the D input of a first D flip-flop 16. The first D flip-flop 16 is clocked at twice the Manchester data rate by a waveform supplied by a clock divider 18 described below with reference to FIG. 9a. The Q output of the first D flip-flop 16 (node A) is connected to the D input of a second D flip-flop 20. The second D flip-flop 20 is also clocked at twice the bit rate of the input data stream, and includes a Q output indicated by the node B. The discriminator 13 operates to sample the Manchester data at twice the bit rate. It follows that the logical state of node A indicates the value of the present sample and that of node B the state of the previous sample. Hence the existence of a logical high at both nodes A and B at the end of a clock cycle indicates the presence of a long high pulse within the input data. Similarly, registration of a logical low at both nodes at the end of a clock cycle corresponds to the incidence of a long low Manchester pulse. In addition, the occurrence of a positive short pulse in the input Manchester waveform will set node A to the high logical state and node B to the low logical state. A negative short pulse will likewise be indicated by a logical low at node A and a logical high at node B during a transition in clock cycles.

Figure 9A:
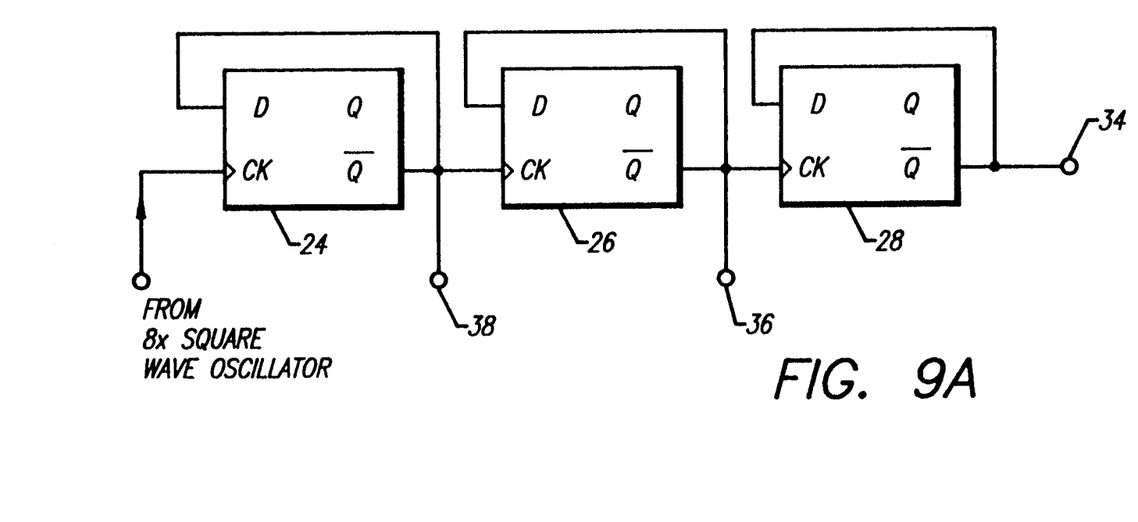
FIG. 9a is a schematic representation of a particular logical implementation of a clock divider included within a preferred embodiment of the apparatus of the present invention.
Figure 9B:
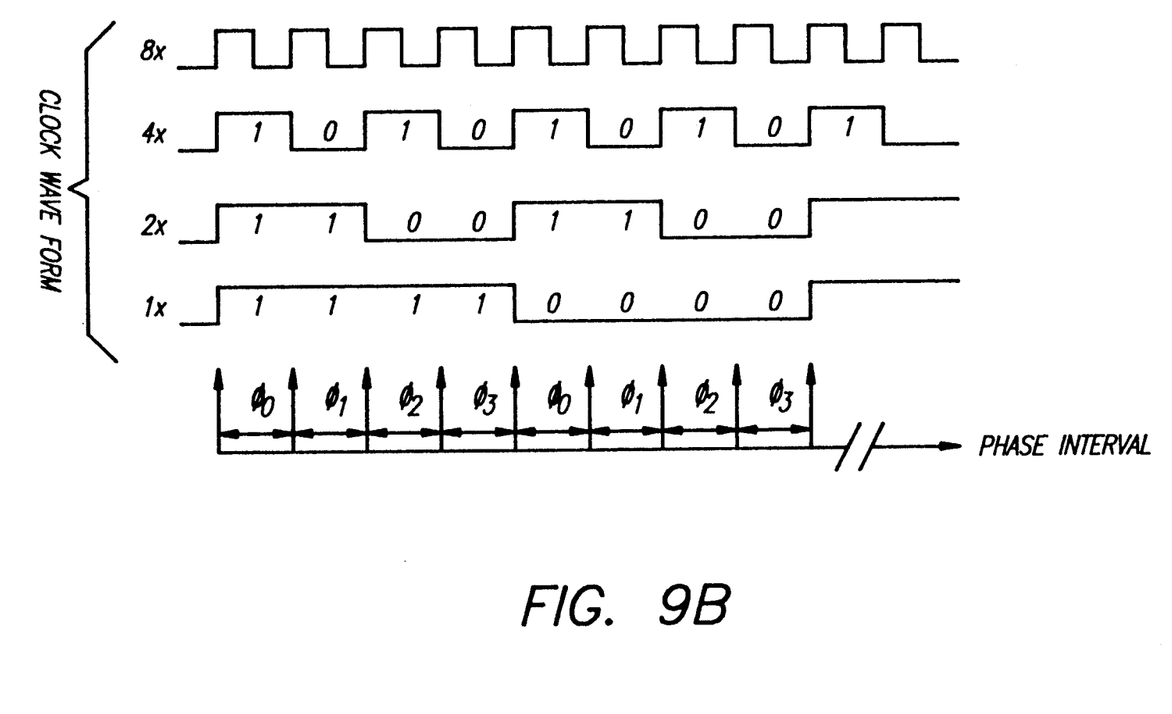
FIG. 9b graphically represents $1\times, 2\times, 4\times$ and $8\times$ bit rate clock waveforms as a function of the phase intervals $\phi_0, \phi_1, \phi_2$, and $\phi_3$.

As indicated above, FIG. 9a provides a schematic representation of a particular logical implementation of the clock divider 18. The divider 18 is seen to include third, fourth and fifth D flip-flops 24, 26 and 28 arranged in a chain-connected configuration. Specifically, the complementary Q output of the third D flip-flop 24 is connected to the clock port of the fourth D flip-flop 26, and the complementary Q output of the fourth flip-flop 26 is connected in like fashion to the clock input of the fifth flip-flop 28. Moreover, the complementary output of each flip-flop within the divider 18 is fed back to the D input thereof. As may be seen with reference to FIG. 9a, the clock port of the third D flip-flop 24 is driven by a square wave from a square wave oscillator 32 (FIGS. 7a and 7b). The oscillator 32 is operative at eight times the frequency of the input data. During operation the divider 18 is disposed to provide square waves at frequencies one (1×), two (2×) and four (4×) times the input data rate at first, second and third output nodes 34, 36 and 38. FIG. 9b graphically represents th 8× bit rate waveform from the oscillator 32 as well as the square waves present at output nodes 34, 36 and 38 as a function of the phase intervals $\phi_0$, $\phi_1$, $\phi_2$, and $\phi_3$.

Referring again to FIGS. 7a and 7b, the clock divider 18 supplies the 2× and 4× square waves to a phasing network 42. The network 42 includes first, second, third and fourth logic phasing terminals 44, 46, 48 and 50 in communication with a control signal logic network 54. Each terminal within the network 42 is disposed to register a logical high during a specific phase of each input data cycle, and to register a logical low otherwise. Specifically, the first and second halves of each Manchester data cycle may be divided into four phase intervals. During the first half of each cycle the phase intervals are denoted as $\phi_0$, $\phi_1$ $\phi_2$, and $\phi_3$, while during the second half the phase intervals are represented as $\phi_0'$, $\phi_1'$, $\phi_2'$, and $\phi_3'$. Thus, a logical high will be registered at first phasing terminal 44 during the interval $\phi_0$, and a logical low during phase intervals $\phi_1$, $\phi_2$, and $\phi_3$. In similar fashion the second, third and fourth phasing terminals 46, 48 and 50 are disposed to pulse high during phase intervals $\phi_1$, $\phi_2$, and $\phi_3$, respectively. The phasing network 42 will generally include an array of AND gates for combining the 2× and 4× waveforms to sequentially pulse the first, second, third and fourth phasing terminals 44, 46, 48 and 50 in accordance with the formulations listed in Table I below:

TABLE I

| Phasing Terminal | Logical Function |
|---|---|
| First ($\phi_0$) | 2x · 4x |
| Second ($\phi_1$) | 2x · 4x* |
| Third ($\phi_2$) | 2x* · 4x |
| Fourth ($\phi_3$) | 2x* · 4x* | wherein * denotes the logical complement.

As is indicated in FIGS. 7a and 7b, the phased outputs $\phi_0$, $\phi_1$, $\phi_2$ and $\phi_3$ are utilized by the control network 54 to synthesize a set of control signals for governing operation of the programmable current source array 11. As is described hereinafter, the logic within the control network 54 stores information relating to the sampled approximations SR and SL of the short and predistoted long Manchester pulses (FIGS. 4 and 6). In operation, the control network 54 monitors output nodes A and B of the pulse discriminator 13 in order to ascertain the presence of either a short or long pulse within the input Manchester data. If, for example, the discriminator 13 indicates reception of a short pulse the control network 54 will issue a set of control signals to the array 11 prescribing that the short pulse approximation SR be transmitted on the line 12. As may be appreciated by reference to FIGS. 10 and 11, each such set of control signals is issued to the current source array 11 in accord with the phase information supplied by the phasing network 42.

Figure 10:
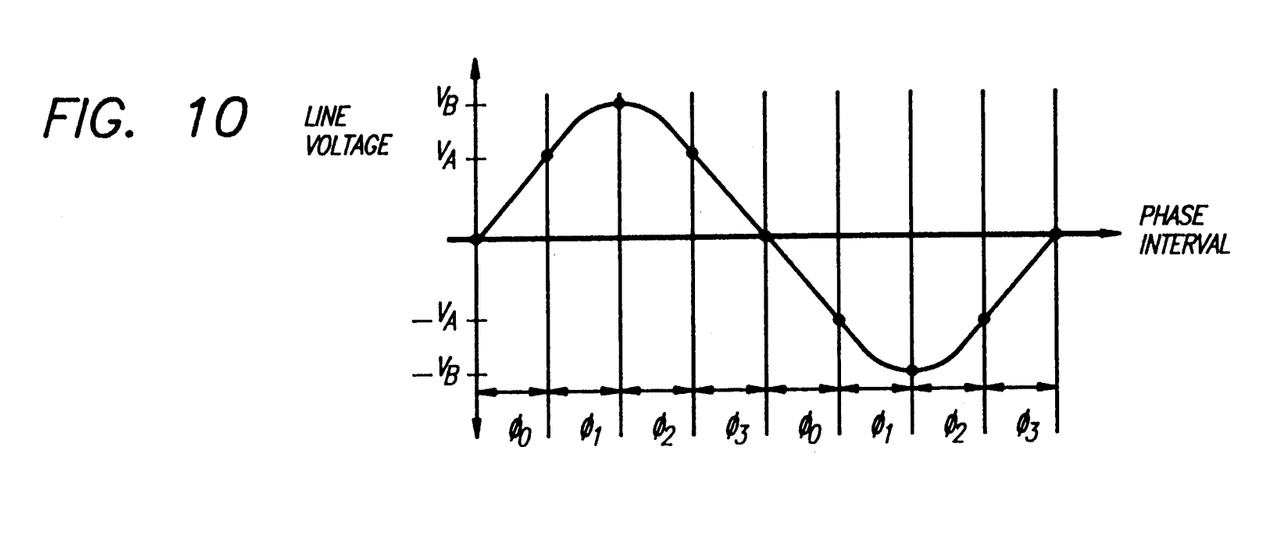
FIG. 10 is a graphical representation of the inventive Manchester short pulse sampled approximation SR as a function of the phase intervals $\phi_0, \phi_1, \phi_2$, and $\phi_3$.

FIG. 10 is a graphical representation of the Manchester short pulse sampled approximation SR as a function of the first half-cycle phase intervals $\phi_0$, $\phi_1$, $\phi_2$, and $\phi_3$, and second half-cycle phase intervals $\phi_0'$, $\phi_1'$, $\phi_2'$, and $\phi_3'$. Again, the phasing network 42 cycles through all four phase cycles during production of each half-period of the sampled approximation. As shown in FIG. 10, during the second phase interval $\phi_1$ of the first half-period the control signals issued by the control network 54 direct the source array 11 to impress a voltage $V_A$ upon the transmission line 12. As a further example, during the phase interval $\phi_2$ of the second half period the line 12 is pulsed with a voltage of $-V_B$. The control network 54 facilitates the sequential pulsing of the line 12 by causing the source array 11 to draw the requisite current during each phase interval.

Figure 11:
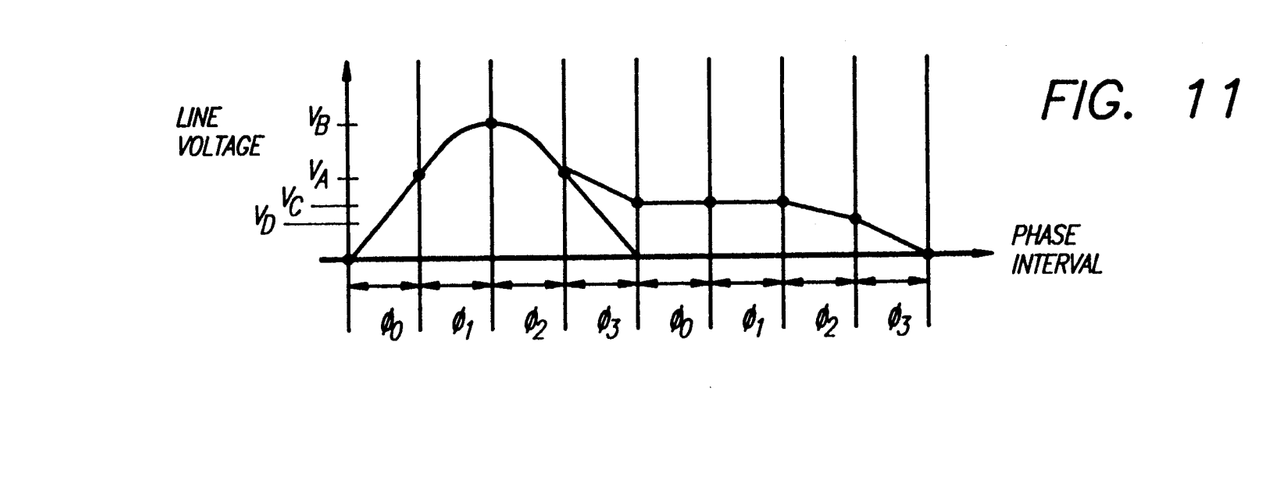
FIG. 11 graphically represents an inventive sampled approximation SL of a predistorted Manchester long pulse as a function of the phase intervals $\phi_0, \phi_1, \phi_2$, and $\phi_3$.

FIG. 11 graphically represents the sampled approximation SL of a predistorted Manchester long pulse in a manner substantially identical to that described above with reference to FIG. 10. For example, during the phase interval $\phi_0$ of the second half-period in the production of the approximation SL the source array 11 impresses a voltage $V_C$ on the transmission line 12. Again, the control network 54 effectuates impression of this voltage on the line 12 by inducing a current flow $I_C$ through the source array 11.

As shown in FIGS. 7a and 7b, the control network 54 communicates with a plurality of transistor switches within the current source array 11 by way of eight current source enable lines $EI_A{}^+$, $EI_A{}^-$, $EI_B{}^+$, $EI_B{}^-$, $EI_C{}^+$, $EI_C{}^-$, $EI_D{}^+$, and $EI_D{}^-$. In operation raising the voltage on any of the enable lines to a logical high induces the indicated current flow through the current source array 11. For example raising the voltages on the lines $EI_B{}^+$ and $EI_D{}^+$ causes the source array 11 to pull a current of $I_B+I_D$. In this way the control signals provided by the network 54 engender a voltage of $V_B+V_D$ on the transmission line 12.

The control network 54 may be realized by a digital network responsive to the signals provided by the pulse discriminator 13 and by the phasing network 42. In particular, the control network 54 is configured such that the source enable lines $EI_A{}^+$, $EI_A{}^-$, $EI_B{}^+$, $EI_B{}^-$, $EI_C{}^+$, $EI_C{}^-$, $EI_D{}^+$, and $EI_D{}^-$ are sequentially pulsed with the requisite phasing to impress either the short or long pulse sampled approximation SR or SL on the transmission line 12. The logical state of the output nodes A and B of the pulse discriminator 13 register the information necessary to determine the polarity (+ or −) and duration (long or short) of Manchester pulses within the input data stream. Table II below summarizes the logical combinations of the discriminator output nodes A and B (FIGS. 7 and 8) which yield a logical high (true) upon identification of the specified pulse type within the input Manchester data:

TABLE II

| Pulse Type Received By Pulse Discriminator | Combination of Nodes A & B Yielding Logical Value of True |
|---|---|
| Short Positive (P) | A · B* |
| Short Negative (N) | A* · B |
| LongPositive (LP) | A · B |
| Long Negative (LN) | A* · B* | wherein * indicates the logical complement.

The control module 54 is configured such that upon one of the logical expressions in Table II becoming true the source enable lines are pulsed in conformity with the sampled approximations SR and SL shown in FIGS. 10 and 11. Table III below describes the particular logical operation carried out by the control module 54 in order to effectuate control of the source enable lines once one of the conditions enumerated in Table II becomes true. Since the logical functions listed in Table II are also incorporated in Table III, it follows that Table III provides a complete description of the logical network included within the control module 54. Accordingly, the control network 54 will be realized using conventional logical elements in a network characterized by the following truth table:

TABLE III

| Source Enable Line | Logical Operation Represented |
|---|---|
| $EI_A{}^+$ | $P \cdot (\phi_1 + \phi_3)$ |
| $EI_A{}^-$ | $N \cdot (\phi_1 + \phi_3)$ |
| $EI_B{}^+$ | $P \cdot (\phi_2)$ |
| $EI_B{}^-$ | $N \cdot (\phi_2)$ |
| $EI_C{}^+$ | $LP \cdot (\phi_0 + \phi_1 + \phi_2)$ |
| $EI_C{}^-$ | $LN \cdot (\phi_0 + \phi_1 + \phi_2)$ |
| $EI_D{}^+$ | $LP \cdot (\phi_3)$ |
| $EI_D{}^-$ | $LN \cdot (\phi_3)$ | wherein P, N, LP and LN are defined in Table I above.

As shown in FIGS. 7a and 7b, each source enable line is buffered by a D flip-flop from a current-switching transistor within the source array 11. In particular, the source enable lines $EI_A{}^+$ and $EI_A{}^-$ address the D inputs of first and second interface flip-flops 60 and 62. Similarly, the enable lines $EI_B{}^+$, $EI_B{}^-$, $EI_C{}^+$, $EI_C{}^-$, $EI_D{}^+$, and $EI_D{}^-$ are connected in an identical manner to third, fourth, fifth, sixth, seventh and eighth interface flip-flops 64, 66, 68, 70, 72 and 74, respectively. In addition, the clock input of each interface flip-flop is driven by the 8× oscillator 32. The interface flip-flops are included to ensure that any logic delay mismatches or spurious signals within the control network 54 do not alter the intended phase relationship between the signals carried by the source enable lines.

Again referring to FIGS. 7a and 7b, the Q output of each interface flip-flop is coupled to the gate of a field-effect current-switching transistor within the source array 11. Specifically, the Q outputs of the first, second, third, fourth, fifth, sixth, seventh and eighth interface flip-flops 60, 62, 64, 66, 68, 70, 72 and 74 drive first, second, third, fourth, fifth, sixth, seventh and eighth current switching transistors 80, 82, 84, 86, 88, 90, 92 and 94. As shown in FIGS. 7a and 7b, the sources of the first and second switching transistors 80 and 82 are coupled to a first current source 102 of magnitude $I_A$. Similarly, the sources of the transistor pairs consisting of the third and fourth 84 and 86, fifth and sixth 88 and 90, and seventh and eighth 92 and 94 switching transistors are electrically connected to second, third and fourth current sources 104, 106 and 108 of magnitude $I_B$, $I_C$ and $I_D$, respectively.

As is indicated in FIGS. 7a and 7b, the drains of the four pairs of switching transistors are connected in parallel to positive and negative source array output nodes 112 and 114. The switching transistors are biased from +5 V power sources via first and second termination resistors 116 and 117, with the resistors 116 and 117 being in communication with the positive and negative output nodes 112 and 114, respectively. The termination resistors 116 and 117 are selected to have an impedance ($Z_0/2$) equivalent to one-half of the characteristic impedance ($Z_0$) of the transmission line 12.

The transmission line 12 is joined to the source array output nodes 112 and 114 by way of a transformer 118. More specifically, the transmission line 12 is conventionally coupled to first and second transformer output terminals 122 and 124. In many applications the transmission line 12 will be realized by unshielded twisted-pair wire having a characteristic impedance of one-hundred fifty ohms. In the embodiment of FIGS. 7a and 7b the transformer 118 has a turns ratio of 1:1, although different ratios may be selected for purposes of impedance matching. It is noted that selection of a turns ratio other than 1:1 will generally change the relative value of the termination resistors 116 and 117 required to match the characteristic transmission line impedance $Z_0$.

Referring again to FIGS. 10 and 11 in conjunction with FIGS. 7a and 7b, it is seen that the logical structure of the control network 54 may be determined once the current sources $I_A$, $I_B$, $I_C$ and $I_D$ have been programmed with a desired set of magnitudes. For example, assuming a current of $I_A$ through the second termination resistor 117 engenders a voltage of $V_A$ on the transmission line 12 as measured across the transformer output terminals 122 and 124, then one way of effecting a transmission line voltage of $V_A$ is to set the magnitude of the first current source 102 to $I_A$ with the first switching transistor 80 turned on and the remaining current switching transistors turned off. As shown in FIG. 10, a voltage of $V_A$ is required during the phase interval $\phi_1$ included within the first half-period of the sampled short pulse approximation SR. It follows that the logic within the network 54 will be synthesized to pulse the source enable line $EI_A{}^+$ high during this interval while maintaining all other source enable lines in the logical low condition. Similarly, the voltage $V_B$ may be effected during the succeeding phase interval $\phi_2$ by pulsing source enable line $EI_B{}^+$ high and holding all other source enable lines in the logical low condition. In this way a current of IB drawn by the second current source 104 is induced to flow through the second termination resistor 117 in order to create the requisite transmission line voltage $V_B$.

Since four voltage pulses of equal duration are used to approximate each half-period of the sampled approximation SR depicted in FIG. 10, the relative values of the current sources $I_A$ and $I_B$ are given by the ratio $\sin(45°) = I_A/I_B$. Inspection of FIG. 11 reveals that the first half-period of the sampled approximation SL is substantially identical to the corresponding portion of the sampled approximation SR (FIG. 10). Again, the appropriate magnitude of for the second half-period of the sampled approximation SL will generally be determined empirically as described above.

In order to further reduce the harmonic content of the short and predistorted long pulse sampled approximations SR and SL, a capacitor or other circuit element having a capacitive reactance may be suspended between the source array output terminals 112 and 114. The inclusion of such a circuit element within the source array 11 will tend to smooth the shape of the sampled approximations SR and SL, thus reducing the magnitudes of the high frequency spectral components associated therewith.

While the present invention has been described herein with reference to a particular embodiment, it is understood that the invention is not limited thereto. The teachings of this invention may be utilized by one having ordinary skill in the art to make modifications within the scope thereof. For example, in alternative embodiments of the present invention the number of differentially-gated current sources included within the current source array may vary from that disclosed above. In such alternative embodiments the control network will be modified in accordance with the teachings herein such that the source enable lines are pulsed during the appropriate phase interval. The invention is similarly not limited solely to the transmutation of Manchester data for transmission upon a signal line. Those skilled in the art may know to apply the teachings of the present invention to other data formats wherein the pertinent signal information may be divined from knowledge of, for example, the location of the zero crossings within the data waveform. In addition, the speed of certain semiconductor technologies may require that the frequency of the clock source 32 be reduced by employing, for example, a mulitphase clock generator. Such a frequency reduction would generally necessitate appropriate modification of the control logic and current array.

It is therefore contemplated by the appended claims to cover any and all such modifications.

Accordingly,

What is claimed is:

1. A programmable waveshaping apparatus for reducing harmonic noise by predistorting a binary encoded waveform to be transmitted over a transmission line, said programmable waveshaping apparatus comprising:

pulse discriminator means for receiving said binary encoded waveform and for indicating each pulse within an input sequence of short and long pulses included within said binary encoded waveform;

input logic means for generating first and second sets of control signals upon receiving each of said short and long pulses, respectively, said input logic means including means for synthesizing said first and second sets of control signals based on information included within said binary encoded waveform relating to a plurality of sampled approximations of filtered versions of said short and long pulses;

programmable electrical source means for generating a sequence of line driving signals in accordance with said first and second sets of control signals; and     transformer driver means for sequentially providing pulses to said transmission line in response to said sequence of line driving signals in order to transmit information included within said binary encoded waveform.

2. The programmable waveshaping apparatus of claim 1 wherein said input logic means further includes means for storing said information relating to said plurality of sampled approximations of said short and long pulses.

3. The programmable waveshaping apparatus of claim 2 wherein said input logic means further includes a first logical network for generating said first set of control signals.

4. The programmable waveshaping apparatus of claim 3 wherein said input logic means further includes a second logical network for generating said second set of control signals.

5. The programmable waveshaping apparatus of claim 4 wherein said pulse discriminator means includes means for indicating the polarity of said short and long pulses.

6. The programmable waveshaping apparatus of claim 5 wherein said input logic means further includes a clock divider for supplying first and second clock signals of first and second integrally related clock frequencies.

7. The programmable waveshaping apparatus of claim 6 wherein said input logic means further includes a phasing network for logically combining said first and second clock signals in order to provide a plurality of phased output signals for driving said first and second logical networks.

8. The programmable waveshaping apparatus of claim 7 wherein said programmable electrical source means includes a plurality of switched electrical sources connected in parallel.

9. The programmable waveshaping apparatus of claim 8 wherein said transformer driver means includes a transformer connected between first and second terminals, and wherein each of said plurality of switched electrical sources includes a first transistor gate connected to said first terminal and a second transistor gate connected to said second terminal.

10. The programmable waveshaping apparatus of claim 9 wherein said plurality of sampled approximations of said filtered versions of said short and long pulses includes a desired set of magnitudes for said plurality of switched electrical sources.

11. A method of reducing harmonic noise by predistorting a binary encoded waveform to be transmitted over a transmission line, said binary encoded waveform including an input sequence of short and long pulses, the method comprising the steps of:
  (a) storing information relating to a filtered version of said input sequence having reduced harmonic content;
  (b) receiving said input sequence and discriminating between said short and long pulses;
  (c) synthesizing a first set of control signals on the basis of said stored information upon receipt of one of said long pulses and synthesizing a second set of control signals on the basis of said stored information upon receipt of one of said short pulses;
  (d) generating a sequence of line driving signals in accordance with said first and second sets of control signals; and
  (e) sequentially pulsing said transmission line in response to said sequence of line driving signals in order to launch thereon a sampled approximation of said filtered version of said input sequence.

12. The method of claim 11 wherein said step of storing information includes the steps of:
  (a) determining the output of a low-pass filter to said short and long pulses and
  (b) storing N samples of said low-pass filter output generated in response to said short pulses and N samples to said low-pass filter output generated in response to said long pulses.

13. The method of claim 12 wherein said step of synthesizing includes the step of generating said first and second sets of control signals at the rate of M times the frequency of said long pulses.

14. The method of claim 13 wherein said step of storing information further includes the step of realizing a digital logic network to control timing for generating said first and second sets of control signals.

15. The method of claim 14 wherein said step of storing information further includes the step of setting magnitudes of a plurality of current sources on a basis of said samples of said filter output.

16. The method of claim 11 further including the steps of detecting the polarity of said received short and long pulses and smoothing said sampled approximation launched on said transmission line.

* * * * *